United States Patent Office 3,673,030
Patented June 27, 1972

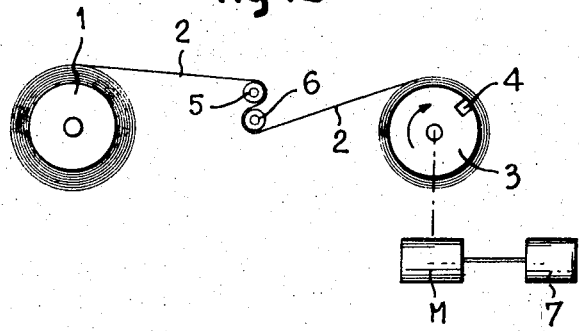
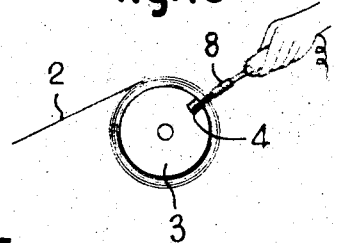
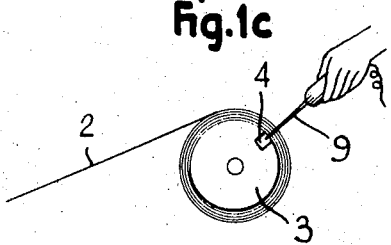
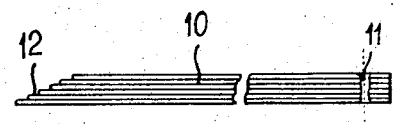
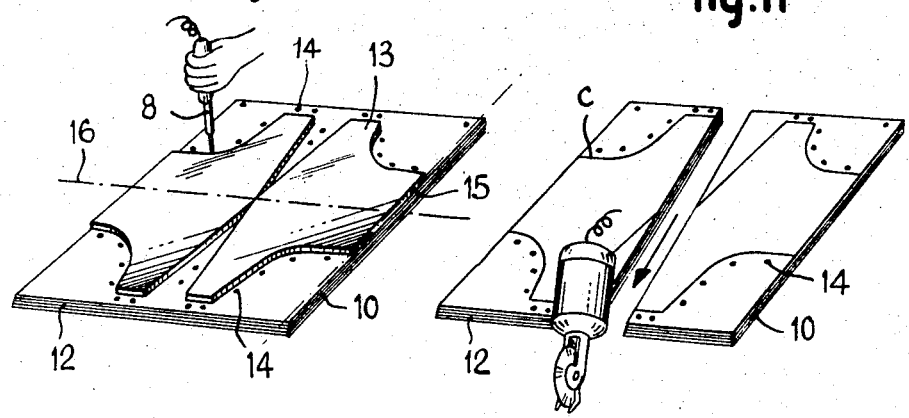
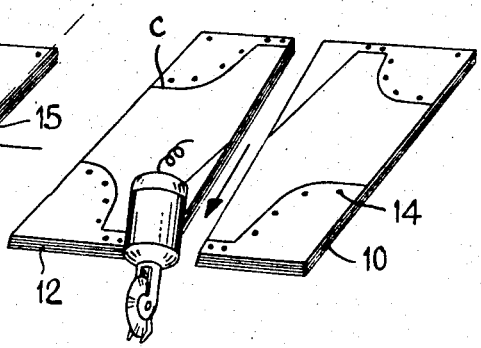
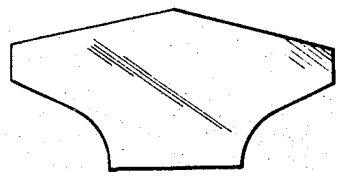

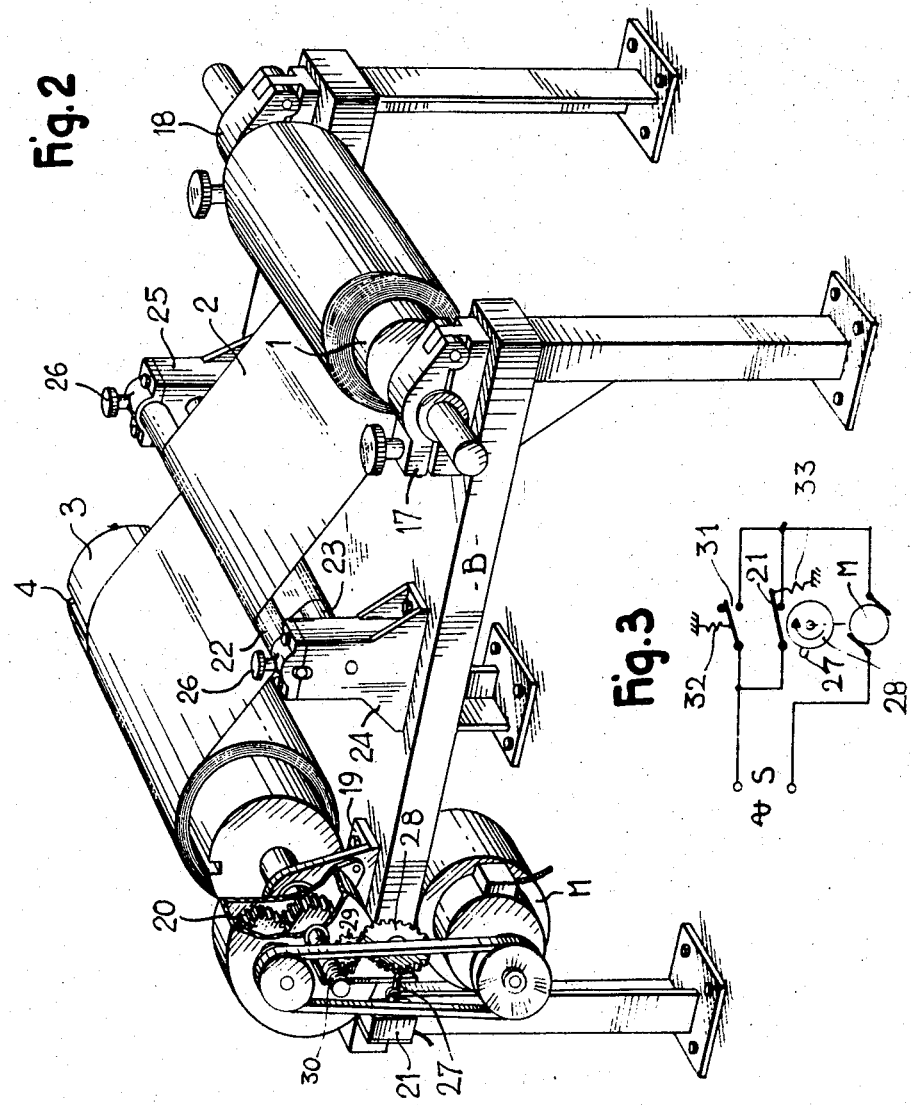

---

3,673,030
METHOD FOR MANUFACTURING ARTICLES MADE OF FLEXIBLE PLASTIC
Philippe Blanc de La Naulte, Paris, and Roland Ginhoux, Le Perreux, Val-de-Marne, France, assignors to Comptoir Europeen de Distribution et de Representation, Paris, France
Filed Feb. 13, 1970, Ser. No. 11,172
Claims priority, application France, Feb. 13, 1969, 693,483
Int. Cl. B65h 81/00
U.S. Cl. 156—193           3 Claims

ABSTRACT OF THE DISCLOSURE

A method of manufacturing articles made of a flexible plastic, notably polyethylene, supplied in the form of a roll of a continuous sheet, which comprises: constituting, as the unrolling of a predetermined length of said continuous sheet proceeds, a stack of parallel layers formed by moving the continuous sheet at constant rate and always in the same direction; locally interlocking together the stacked layers; slicing through said layers in a region spaced relative to said region where said layers are joined together; flattening out the stack of sliced layers in order to obtain a pile of layers; and cutting through the pile of layers to the pattern of the article to be made up.

---

The present invention relates to the manufacture of articles made of flexible plastic.

The thermoplastic materials used for the manufacture of flexible articles to be formed according to a determined shape, such as pack-bags, or waterproof baby pants, are generally delivered in the form of a roll of continuous sheet or in the form of a pile of separated sheets.

The sheet rolls on piles are to be cut to determined patterns in order to obtain flat blanks for making up the desired articles.

When said articles are to be thrown away after use only once, a low manufacture cost is necessary. It is, therefore, necessary to obtain a great number of articles for each cutting step.

A stack of superposed sheets is therefore preferred. But the cost price is higher for plastic material in form than in a roll of continuous sheet because of the need to prepare the pile by folding and subsequent cutting.

In the form of rolled sheet, the cost is lower but the roll cannot be conveniently used without costly intermediate operations, as making up of a pile, before the manufacture of cut articles; except if these articles are cut out individually, or even in a plurality of four or five articles, through a single thickness of the sheet, which is prohibitive from the cost point of view.

The manufacturing method according to the invention avoids these disadvantages and enables the cost price to be considerably reduced to an extent such that the finished article can be sold at a price low enough for it to be thrown away after it has been used only once.

The present invention accordingly provides a method of manufacturing articles made of flexible plastics supplied in the form of a roll of a continuous sheet, said method comprising: constituting, as the unrolling of a predetermined length of said continuous sheet proceeds, a stack of parallel layers formed by moving the continuous sheet at a constant rate and always in the same direction; locally interlocking together the stacked layers; slicing through said layers in a region spaced relative to said region where said layers are joined together; flattening out the stack of sliced layers in order to obtain a pile of layers; and cutting through the pile of layers to the pattern, of the article to be made up.

The above-disclosed method thus eliminates the prior-art initial phase of cutting up the continuous sheet to produce a pile of separate sheets, for the continuous sheet of plastic, after unrolling, is for example rolled up as it is extruded on to a roller and the entire roll is then sliced along a generatrix line thereof, a pile of sheets being produced without difficulty after development.

The said method can be performed particularly for the manufacture of articles in polyethylene et notably of waterproof baby pants.

While polyethylene is suitable for the manufacture of pants, previously the cost price was heavily weighted by operations which preceded the cutting and involved considerable labor.

The method according the present invention permits:

the direct use of polyethylene delivered at its lower cost, i.e. in the form of a roll formed by the sleeve produced industrially by extrusion through an annular diestock, then rolled on itself and flattened;
the high rate making of a pile of sheets of; and
the cutting, of a great number of articles for each cutting operation; thus a minimum cost is reached.

On the contrary the prior-art piles of sheets, and in accordance with a feature of the present invention, the pile obtained by the method just described is characterized by the fact that the successive layers are in reality joined two by two since they consist of cross-sections of superimposed flattened sheets. Furthermore, the layers are prevented from slipping over one another because they are previously welded together locally close to the edge which is subsequently sectioned.

Finally, the fact that the various layers are welded together close to the sectioned edge and the pile is obtained by unrolling the successive layers of a roll results in the unwelded free sliced edge having a bevelled appearance due to the gradually increasing lengths of the strata of layers making up the pile.

It should be noted that the commercially available rolls of plastic sheet obtained by extrusion through an annular diestock are not evenly rolled up and do not have a constant number of turns. For this reason the method of this invention provides another winding of the sleeve prior to which it is preferable to introduce an operation for centering and tensioning the sheet, and during said winding it is desirable to count the number of turns and stop the operation after a preset number has been reached.

A groove formed in said roller has primarily for its object to facilitate the welding and sectioning operations.

The welding can be done by any convenient means, and for example by means of a soldering iron driven at several points into the groove through the rolled sleeving.

After the pile has been unrolled flat and prior to cutting out the shape of the end-product, it is preferable to place a pattern on the pile to allow the required shape to be marked.

In a preferred embodiment of the invention, in order to improve the adhesion between the various layers of strata and to avoid slipping, spot welds are additionally made—with a soldering iron for instance—in those portions of the pile which are located outside the pattern will therefore become waste after the cutting has been done.

Further it is provided, particularly for the manufacture of pants and, more generally, when the article to be cut out has at least one symmetrical axis—a cutting with the sheet folded along a half-contour only, provides that the symmetry axis of the entire contour is made to coincide with the folded edge of the sheet. This reduces the cutting operation by half, thus further lowering the cost price. In particular, pants laid flat normally have two symmetric axes, of which one is transverse to the line running from the fork down the legs. If this latter axis is placed along the folded edge of the sheet it will be sufficient to cut only the two half-openings corresponding to the legs and the waist level respectively. Thus, when folded along the fold line, the pants are each obtained by a single half-cut.

Since the sheet is folded on two opposite edges of the pile, it is desirable and advisable to cut at the same time two half-contours on either side of the sheet, and to do this on a sheet having a width equal to or greater than twice the dimension of the contour perpendicularly to the symmetric axis made to coincide with the folded edge. In this way two articles can be obtained per section of folded sheet, and if there are $n$ sheets folded in the pile then $2n$ articles can be obtained even through the length cut corresponds in point of fact only to the contour of a single article.

It is furthermore apparent that the method offers other advantages, notably with regard to hygiene, an important point in the case of babies' waterproof pants. As the annular diestock extrudes a sheet and rolls it on to a roller, the present method of this invention does not, at any stage of manufacture, require the facing surfaces of the polyethylene inside the sheet to be separated, in contrast to the prior technique; in other words, the facing surfaces of the polyethylene that will form the inside of the pants will, at the time of the retail sale, be precisely the surfaces applied against each other when the polyethylene was being extruded.

The same advantage is offered for the manufacture of articles designed to contain foods.

A further result of this method, particularly during the tensioning and centring process (usually done by friction), is that the two half-portions of the article adhere to each other under the effect of a charge of static electricity.

Obviously, in order to enable such articles to be thrown away after use, notably in the case of babies' pants, it is preferable to avoid having to add subsequent accessories such as elastic bands or press-studs. The invention accordingly provides for so contouring the pants that their dimensions and shape allow this to be achieved. The pattern contours are characterized above all in that they are widely dimensioned in relation to ordinary pants intended for babies of the same age, thus enabling the periphery of the pants to be folded back into the layers and knots to be tied on the sides of the baby, so obtaining a completely waterproof arrangement. To facilitate folding into the layers, the contour which is to run round the waist is cut so that it forms a peak in the middle of the back and in the middle of the stomach. Further, this concept of a widely dimensioned pants makes it possible to manufacture a single size only regardles of the baby's age and corpulence, a feature which reduces the cost of stock management.

The present invention further relates to a machine for performing the above-described method. This machine includes a stand, means for supporting a roll of continuous plastic sheet about a horizontal axis; means for rerolling said sheet on a roller of appropriate diameter formed with a groove along one of its generatrices, and means interposed between said roll and said roller for tensioning and centring the plastic sheet as it is rolled up anew.

Preferably, the sheet tensioning and centring means consist of two horizontal cylindrical members, of which one at least is fixed, placed one above the other upstream of the groove roller and around which the plastic sheet rubbingly slips along an S-shaped path. The tension can readily be adjusted by providing means for varying the spacing between the said two cylindrical members. It has been found that the friction of the plastic sheet over one at least of said cylindrical members reduces the electrostatic charge which is invariably present on such sheet.

In order to enable the subject method of this invention to be performed in practical fashion, means must also be provided for counting the number of revolutions of the grooved roller as well as a device for stopping its rotation after a preset number of revolutions, which number will control the thickness of the pile to be subsequently cut.

The operation of cutting along the groove, of spot-welding or otherwise welding, and of subsequent cutting can likewise be mechanized in accordance with this invention. However, in the current state of the art, the latter operation can without serious inconvenience be carried out manually without necessarily increasing the cost price of the articles.

Further objects, advantages and features of the invention will be apparent from the following description, given with reference to the accompanying drawings, in which:

FIG. 1a schematically illustrates the initial phase, to wit the process of winding on to the grooved roller.

FIG. 1b shows the spot-welding along the groove.

FIG. 1c shows the cutting done with a blade along the groove on said roller.

FIG. 1d shows the pile after it has been unrolled flat.

FIG. 1e shows the pattern placed on the pile and the spot-welds made outside the pattern.

FIG. 1f shows the pile on which the contour has been marked out and which has undergone an initial cutting.

FIG. 1g shows a finished pair of pants.

FIG. 2 shows a machine for performing the subject method of this invention.

FIG. 3 is an electrical wiring diagram for counting the number of revolutions made by the grooved roller and for stopping the latter after a predetermined number of revolutions.

Referring first to FIG. 1a, reference numeral 1 designates the roll of raw material as it issues from the extruding machine, namely a roll of sheet material made notably of polyethylene.

A layer of this sheet, shown at 2, is wound as previously explained on to a roller 3 driven by a motor M and formed with a longitudinal groove 4. Between roll 1 and roller 3 is a tensioning and centring device, of which are visible the sections of the two bars 5 and 6 forming the same. The layer 2 travels in an S-path between the two bars 5 and 6.

The number of revolutions made by roller 3 can be counted by a device 7 coupled to the motor and to roller 3. This device can if necessary stop the roller 3 after the latter has achieved a predetermined number of revolutions.

FIG. 1b illustrates the second phase of the process. After roller 3 has been stopped, a hot iron 8 is inserted locally into the body of the rolled plastic sheet in or near the groove 4. Subsequently (FIG. 1c) the material is cut through by a blade 9 along the groove 4. After this operation, the roll is opened out and laid flat to obtain a pile 10 of multiple strata sheet, each formed by a sheet section.

FIG. 1d shows the pile 10 in section through one of the spot-welds made with the iron 8 along an end-section, as represented by the dotted line at 11.

Furthermore, because the pile was originally wound upon a roller 3, the length of the successive strata, depending as they do on the winding diameter, must differ from one layer to the next. As a result, the non-welded free edge that does not correspond to a fold exhibits a bevelled appearance, as shown at 12.

In the more general form of the process, the contours of the article to be made are then cut out on this pile. This can be done by placing a pattern 13 on the pile 10 (FIG. 1e). Using the soldering iron 8, spot-welds are then made around the pattern 13 in areas that will ultimately be waste material, in order to prevent the strata stacked layers from slipping over one another during the cutting. These welds are represenetd as spots such as 14. The pattern 13 shown in the drawings is intended for the manufacture of waterproof babies' pants according to the invention. The pants' symmetrical axis 15, which is perpendicular to the line running down from the fork in the pants, is made to coincide with the fold in the sheet section located at the upper part of pile 10. As is clearly visible, the pattern consists of two symmetrical elements enabling two pairs of pants to be cut out from the surface of the pile, which necessarily implies that the width of the flattened sheet (or the semi-perimeter of the sheet which is supposed circular) is at least equal to the greatest dimension of the combined two half-contours as measured along the axis 16 perpendicular to axis 15. The cutting proper can be done in any convenient order. As shown in FIG. 1f, however, it is preferable to begin by slitting through the thickness of the pile with an electric cutter, along the two half-contours forming the edge of the pants at waist level.

After cutting out is complete, pants of the profile shown in FIG. 1g are obtained.

The present invention also relates to a machine, shown in FIG. 2, for manufacturing these articles. This machine includes a stand B of overall table shape, on which are mounted the various means for unrolling and rerolling the layer of flattened sleeving. The roll 1 which receives the polyethylene issue issuing from the extruder is arranged horizontally on two bearings 17 and 18 which leave roll 1 freely rotatable on its shaft.

The roller 3 formed with the groove 4 is mounted on the other side of the stand, on two bearings 19.

In contrast to roll 1, roller 3 can be positively driven by a motor M through reduction gearing 20. An electro-mechanical device 21 is coupled to roller 3 for the purpose of counting the number of revolutions and stopping said roller after a preset number thereof.

Between roll 1 and roller 3 the sheet 2 travels through a tensioning and centering system of two horizontal parallel bars 22 and 23, of which one at least is prevented from rotating and both of which are restrained by two uprights 24 and 25. The sheet 2 travels between these two bars in an S-path. Then tensioning is obtained by simple friction between at least one of said bars 22 and 23 and the sheet 2. The friction can be adjusted by varying the gap between the bars by means of two knobs 26 and 27.

As already indicated, the machine could be further supplemented by causing the operations subsequent to the rolling on to roller 3 to be mechanized. However, the operations performed by this machine can be carried out manually without detrimental effects on the cost price constraints imposed by the applicant.

The thickness of the pile, and hence the number of turns of sheet material 2 on roll 3, can easily be determined by means of an electro-mechanical system 21 consisting of a switch operated by a catch 27 carried on the periphery of a gearwheel 28 driven by a further gearwheel 29 meshing with a worm-gear 30 rigid with the shaft of roller 3. Each time gearwheel 28 completes one revolution, the motor stops and the reduction ratio between worm-gear 30 and gearwheel 29 determines the number of turns of sheeting 2 wound on roller 3.

Reference is lastly had to FIG. 3 for an electrical wiring diagram adapted to stop and restart the roller 3, the motor M being powered from a source of electric current S. A switch 31 is held open by a spring 32. In contrast, the switch 21 is parallel-connected to switch 31 and is kept closed by a spring 33 except when catch 27 on gearwheel 28 constrains it to open and thereby cut off the current to motor M.

After the rolled sheet has been removed from roller 3 to form a pile and a fresh rolling-up operation is to begin, switch 31 is pressed manaully in order to restart motor M, thereby automatically disengaging catch 27 from switch 21 and restoring the supply of current to the motor for a further complete revolution of gearwheel 28.

Many changes and substitutions of parts may be made in the specific forms of embodiment hereinbefore described for exemplary purposes, without departing from the spirit and scope of the invention.

What is claimed is:

1. The method of manufacturing articles made from flexible sheet plastic supplied in the form of a roll of a continuous sheet comprising the steps of
    (a) unrolling a predetermined length of a continuous sheet of flexible plastic forming a stack of superposed layers formed by rolling up said continuous sheet onse more on a roller of appropriate diameter having a groove extending along a generatrix of its surface, moving the continuous sheet at a constant rate and always in the same direction,
    (b) locally interlocking together the superposed layers along said generatrix adjacent said groove,
    (c) slicing through said layers in a region spaced proximate the area where said superposed layer are interlocked together,
    (d) flatting out the stack of sliced layers in order to obtain a pile of layers, and
    (e) cutting through the pile of layers to the pattern of the article to be made up.

2. The method of claim 1 further comprising tensioning and centering the sheet in order to insure even winding before rewinding of the predetermined length of continuous sheet on the roller of appropriate diameter.

3. The method of claim 1 wherein the continuous sheet is of polyethylene.

References Cited
UNITED STATES PATENTS

| | | | |
|---|---|---|---|
| 2,650,182 | 8/1953 | Green | 156—290 |
| 2,749,640 | 6/1956 | Scott | 156—251 |
| 2,957,792 | 10/1960 | Magid | 156—251 |
| 2,976,199 | 3/1961 | Rand | 156—251 |
| 3,225,764 | 12/1965 | Magid | 156—251 |

CARL D. QUARFORTH, Primary Examiner

G. G. SOLYST, Assistant Examiner

U.S. Cl. X.R.

156—191, 194, 251, 267, 268, 269